Patented Sept. 7, 1948

2,448,892

UNITED STATES PATENT OFFICE 2,448,892

OXIDATION OF CELLULOSE

William O. Kenyon and Edward C. Yackel, Rochester, N. Y., assignors to Eastman Kodak Company, Rochester, N. Y., a corporation of New Jersey No Drawing. Application January 1, 1945, Serial No. 571,012

3 Claims. (Cl. 8—116)

This invention relates to the oxidation of cellulose and more particularly to the oxidation of cellulose by the use of a solution in a halogenated hydrocarbon of $NO_2$ or its dimer $N_2O_4$.

Over the past decade or two, considerable work has been done upon the treatment of cellulose and cellulose esters with $NO_2$ or its dimer $N_2O_4$. For convenience of description, we will employ herein the term nitrogen dioxide to indicate an equilibrium mixture of $NO_2$ and its dimer $N_2O_4$, at the temperature, pressure and other conditions at which the work is being done, it being well understood in the art that this equilibrium mixture forms with the $NO_2$ and the $N_2O_4$ in proportions depending upon the conditions present.

Possibly one of the earliest publications upon this subject occurred in the Staud and Webber U. S. Patent 1,939,235, in which was described the pretreatment of cellulose by an acetic, propionic, butyric acid and the like solution of nitrogen dioxide in order to prepare the cellulose for more active acetylation or acylation. While oxidation was obtained by this pretreatment, some acetylation also took place due to the acetic acid present and no thought of obtaining separately usable oxidized cellulose was evidenced by that patent.

The Staud and Van Dyke U. S. Patent 1,917,401 employed a carbon tetrachloride solution of liquid nitrogen dioxide as a medium which, along with acetic anhydride and catalyst present, gave a cellulose acetate nitrate.

The Staud and Fuess U. S. Patent 1,917,400 describes the treatment of cellulose with gaseous or liquid nitrogen dioxide. These patentees, while primarily interested in the nitration of cellulose, of course, obtained some oxidation of the cellulose, as well; they employed no liquid diluent or carrier for the nitrogen dioxide.

Our U. S. Patent 2,232,990 features the oxidation of cellulose by the use of either gaseous or vaporous nitrogen dioxide but no liquid diluent or carrier for the nitrogen dioxide was described.

Our U. S. Patent 2,338,587, granted January 4, 1944, describes a manner in which hydrolyzed cellulose acetate may be treated with a solution of nitrogen dioxide in halogenated hydrocarbons and other media. Obviously, a cellulose ester was obtained from such treatment.

We have found that very useful and pure oxidized celluloses containing only a low nitrogen content and no other substituents can be prepared with great facility if the cellulose is merely treated by immersion at ordinary room temperatures with a solution of nitrogen dioxide in a halogenated hydrocarbon. Such for instance as carbon tetrachloride, ethylene dichloride, propylene dichloride, hexachlorethane, tetrachlorethane, chlorobenzene and the like, which are inert to nitrogen dioxide and to cellulose.

It is, therefore, an object of our invention to produce oxidized cellulose having all degrees of oxidation possible with the cellulose molecule. It is a further object of our invention to greatly simplify the oxidation of cellulose by the use of an inert solvent in which has been dissolved nitrogen dioxide in suitable proportions. It is a further object of our invention to oxidize cellulose with the introduction of no other substituents than a small amount of nitrate radicals. Other objects will appear hereinafter.

Our invention may be carried out in the main as follows:

Air-dried cellulose which normally contains in the neighborhood of 4 to 6% moisture is employed; the cellulose is preferably in the form of loose cotton, or gauze in the form of rolls or such other forms as may be desired, paper in sheet form, thread in skein or spool form, wood pulp in loose form, or the like, all of these forms of cellulose of course being preferably in purified form. The nitrogen dioxide is placed in solution in a halogenated hydrocarbon such as in carbon tetrachloride, by merely mixing the liquid nitrogen dioxide with the carbon tetrachloride or other halogenated hydrocarbon while both are below the boiling point of the nitrogen dioxide such as for instance at 20° C. or lower. The amount or proportion of nitrogen dioxide to the halogenated hydrocarbon will depend upon the degree of oxidation of the cellulose which is desired. For instance if we employ a 1% solution of nitrogen dioxide in the halogenated hydrocarbon a rather low degree of oxidation will be obtained.

On the other hand if one employs a 50% solution of nitrogen dioxide in halogenated hydrocarbon (equal parts by weight of each) it is possible to oxidize the cellulose with such solution to substantially the full degree of oxidation obtainable with nitrogen dioxide. The cellulose is simply submerged in a container of the halogenated hydrocarbon solution of nitrogen dioxide, at room temperature, the vessel closed for safety reasons and the cellulose allowed to stand until the desired degree of oxidation is obtained such as from one to sixteen hours. The proportion of the halogenated hydrocarbon solution of nitrogen dioxide to the cellulose is not critical. A convenient rule of thumb being that it is preferable to have the cellulose immersed in the solution; of course with a high nitrogen dioxide ratio in the halogenated hydrocarbon one can "get along" with merely enough solution to saturate the cellulose, but if the proportion of nitrogen dioxide to the cellulose is to be reduced below that required to give the extent of oxidation desired one of course would be limited in the amount of oxidation which one could obtain. The range of proportions will be apparent from the examples hereinafter given. Incidentally the solution of nitrogen dioxide in the halogenated hydrocarbon can be produced by merely bubbling nitrogen dioxide vapor through the halogenated hydrocarbon until the proper proportion of nitrogen dioxide has been dissolved, if this is to be preferred over the mixing of liquid nitrogen dioxide and halogenated hydrocarbon as hereinbefore described.

The viscosity of the cellulose to be treated is not highly critical although it may be said that if one desires a product where good tensile strength is a factor, it is best to start with a cellulose of fairly high viscosity such as for instance in the neighborhood of 900 poises; where tensile strength is of no importance one may use a cellulose of much lower viscosity, in fact the viscosity seems to have little bearing upon the actual treatability of the cellulose by our novel method.

The temperature of the treatment is conveniently room temperature. We have found that little is to be gained by going to higher temperatures as it merely causes the nitrogen dioxide to vaporize and create pressure if the vessel is entirely closed or cause a loss of nitrogen dioxide if the vessel is safety valved. As is well known of course some reactions proceed more rapidly under pressure and higher temperatures; hence if apparatus is employed which will stand higher pressures and temperatures our process may of course be operated at temperatures and pressures above normal.

Naturally the purer the form of the reacting materials, the better the product. It is desirable to employ a pure form of halogenated hydrocarbon, such purifications being well known such as by distillation, etc. The nitrogen dioxide may conveniently be prepared by various methods, such as treatment of concentrated nitric acid with concentrated sulfuric acid, reaction of arsenous oxide with nitric acid, heating of lead nitrate, treating concentrated nitric acid with metals, such as copper, etc. One might even say that nitrogen dioxide produced by commercial processes involving the oxidation of nitrogen or its simple compounds may be employed.

Obviously in order to prevent the introduction of radicals other than nitrate into the cellulose, the cellulose should not only be in the purified form but all other reacting materials should be excluded from the reaction. Water, of course, is not one of the materials which need be excluded from the reaction because the air-dried cellulose itself usually contains from 4 to 6% and might even contain anywhere from 0 to 10% or more; the water serves largely to merely dilute the reaction and since water is formed by the reaction itself, its exclusion is not critical.

When operating under the conditions which we have specified and which is illustrated by the examples, a product having a nitrogen content of from approximately .1% to .5% will be obtained. The degree of oxidation obtained will range anywhere from 1% carboxyl up to the theoretical limit of 25% carboxyl by weight. This carboxyl is determined by $CO_2$ equivalence obtained by the use of the calcium acetate or the uronic acid methods described by us in J. A. C. S., vol. 64, pages 121 to 127 (1942). The uronic acid method is preferred for reasons of accuracy.

In addition oxidized celluloses obtained by our method may be classified as those which are or are not soluble in alkaline solutions. For instance, those having 13% or more of carboxyl are soluble in 2% aqueous sodium hydroxide solution while those having less than 13% carboxyl are not ordinarily soluble in such solution. The matter of such classification is interesting for the reason that those celluloses which are soluble in 2% sodium hydroxide solution have one important utility, whereas those oxidized celluloses which are clearly insoluble in 2% sodium hydroxide solution have another form of special utility. The oxidized celluloses having a range from 13 to 18% carboxyl are particularly valuable in the alkali soluble range whereas those celluloses having from 5 to 9% are particularly valuable in the alkali insoluble range. The foregoing carboxyl percentages are by the uronic acid method.

The following examples will illustrate our invention:

*Example I*

10 parts by weight of long fiber cotton were added to a solution prepared by dissolving 3 parts by weight of liquid nitrogen dioxide in 200 parts by volume of carbon tetrachloride. The container was fitted with a condenser to minimize evaporation and the mixture was allowed to stand for 60 hours at room temperature. The oxidized cellulose fibers were pressed to remove as much of the oxidation medium as possible, washed several times with alcohol, then with distilled water until the washings were acid free and dried at 50° C. The dry oxidized cellulose had a carboxyl content of 7.2% by weight as determined using the calcium acetate method.

*Example II*

10 parts by weight of Eastman Filtration cotton were covered with a solution of 1.5 parts by weight of liquid nitrogen dioxide in 250 parts by volume of carbon tetrachloride. The mixture was allowed to stand for 64 hours at room temperature. The oxidized cellulose was then isolated, washed as in Example I and dried at room temperature. The carboxyl content of the product was 1.1% by weight.

*Example III*

This example represents the oxidation of "coiler cotton" a commercial material in which the long fiber cotton is twisted into a loose rope. 6 parts by weight of "coiler cotton" were covered with 72 parts by weight of a solution of equal parts by weight of liquid nitrogen dioxide in carbon tetrachloride. The container was loosely covered and allowed to stand for 5½ hours at room temperature. The product was washed free of mineral acid and dried at ordinary temperature. The oxidized "coiler cotton" thus obtained had a carboxyl content of at least 13% for it dissolved readily and completely in a 1% aqueous sodium hydroxide solution. Using this relatively low ratio of oxidation solution to "coiler cotton" the absorption was so great that practically all of the solution was absorbed in the fibers of the cotton.

A similar oxidation employing a reaction time of 3 hours produced an oxidized "coiler cotton" which had not quite reached the extent of oxidation necessary for solution in the 1% sodium hydroxide solution.

Example IV 60 parts by weight of a water leaf paper were covered with 720 parts by weight of a solution prepared by mixing equal parts by weight of liquid nitrogen dioxide and carbon tetrachloride. The covered container was allowed to stand at room temperature for 16 hours. The paper was removed, washed free of mineral acid and dried. The resulting oxidized paper was soluble in 1% aqueous sodium hydroxide solution thus showing an extensive oxidation.

Example V 5.5 parts by weight of gauze were covered with a solution of 200 parts by volume of liquid nitrogen dioxide in 200 parts by volume of propylene dichloride. After 20 hours at room temperature the product possessed a carboxyl content of 10.3% by weight as determined by the calcium acetate method.

Example VI 6 parts by weight of surgical gauze were submerged in 72 parts by weight of a solution prepared by mixing equal parts by weight of liquid nitrogen dioxide and carbon tetrachloride. After standing in this mixture for 3 hours at room temperature, the gauze was washed free of oxidizing medium using distilled water and dried. The oxidized gauze was completely soluble in 1% aqueous sodium hydroxide solution.

Example VII 425 feet of 15" width surgical gauze, comprising about 1000 grams in weight were wound into a loose roll. This was covered with a solution composed of 1 part of liquid nitrogen dioxide to 2 parts of carbon tetrachloride (by weight), using an 18.3 to 1 ratio of this solution to gauze on a weight basis. This would be 18,300 grams of the oxidizing medium to 1000 grams of gauze. The container, loosely covered, was allowed to stand at room temperature for 16 hours. The gauze was drained to remove as much as possible of the residual oxidation solution, washed free of mineral acid by distilled water and dried. The gauze was soluble in aqueous 1% sodium hydroxide and contained 15.6% carboxyl by weight as determined by the calcium acetate method.

Example VIII 80 parts by weight of fluffed, air-dried alpha cellulose from sulfite wood pulp were immersed in a solution of 16 parts by volume of dried liquid nitrogen dioxide dissolved in 2000 parts by volume of dry carbon tetrachloride. The container was loosely stoppered and allowed to stand at room temperature for 64 hours. The oxidized pulp was filtered from the oxidizing liquid, washed with alcohol, then with distilled water until free of mineral acid. It was dried at room temperature. The oxidized cellulose so obtained possessed a carboxyl content of 4.37% by weight determined by the uronic acid method.

Example IX 6250 parts by volume of dried carbon tetrachloride were mixed with 200 parts by volume of liquid nitrogen dioxide. 250 parts by weight of #30 cotton thread in a loose skein were immersed in the oxidizing solution described. After 64 hours of reaction at room temperature, the thread was removed, washed with fresh carbon tetrachloride, rinsed in alcohol, washed in distilled water until free of mineral acid and dried at room temperature. The oxidized thread possessed a carboxyl content of about 6% by weight as determined by the uronic acid method.

It will be obvious that in all of the instances above set forth, wherein the oxidized cellulose is specified as being soluble in 1% aqueous sodium hydroxide solution it is likewise soluble in 2% aqueous sodium hydroxide solution.

We claim:

1. A method of preparing oxidized cellulose which comprises immersing air-dry fibrous cellulose in a solution of nitrogen dioxide in carbon tetrachloride for 1–16 hours whereby a substantial carboxyl content is imparted to the cellulose.

2. A process of preparing oxidized cellulose in woven form which comprises immersing air-dry woven cellulose in a solution of nitrogen dioxide in carbon tetrachloride for 1–16 hours whereby a substantial carboxyl content is imparted to the cellulose.

3. A process of preparing oxidized cellulose gauze which comprises immersing air-dry cellulose gauze in a solution of nitrogen dioxide in carbon tetrachloride for 1–16 hours whereby a substantial carboxyl content is imparted to the cellulose.

WILLIAM O. KENYON.
EDWARD C. YACKEL.

REFERENCES CITED

The following references are of record in the file of this patent:

UNITED STATES PATENTS

| Number | Name | Date |
|---|---|---|
| 1,699,779 | Cochran | Jan. 22, 1929 |
| 1,934,956 | Wait | Nov. 14, 1933 |
| 1,939,235 | Staud et al. | Dec. 12, 1932 |
| 1,948,276 | Pacini | Feb. 20, 1934 |
| 2,232,990 | Yackel et al. | Feb. 25, 1941 |
| 2,233,475 | Dreyfus | Mar. 4, 1941 |
| 2,338,587 | Kenyon et al. | Jan. 4, 1944 |
| 2,256,391 | Hiatt | Sept. 16, 1941 |

OTHER REFERENCES

Mellor, "Comprehensive Treatise on Inorganic and Theoretical Chemistry," vol. 8, page 536.